(12) United States Patent
Brodnik

(10) Patent No.: US 12,723,467 B2
(45) Date of Patent: Sep. 1, 2026

(54) DUCK BLIND LADDER DEVICE

(71) Applicant: Robert Brodnik, Novato, CA (US)

(72) Inventor: Robert Brodnik, Novato, CA (US)

( * ) Notice: Subject to any disclaimer, the term of this patent is extended or adjusted under 35 U.S.C. 154(b) by 559 days.

(21) Appl. No.: 18/185,734

(22) Filed: Mar. 17, 2023

(65) Prior Publication Data

US 2024/0218739 A1 Jul. 4, 2024

Related U.S. Application Data

(60) Provisional application No. 63/435,563, filed on Dec. 28, 2022.

(51) Int. Cl.

| | |
|---|---|
| ***E06C 1/36*** | (2006.01) |
| ***A01M 31/02*** | (2006.01) |
| ***E06C 7/08*** | (2006.01) |
| ***E06C 7/18*** | (2006.01) |
| ***E06C 7/48*** | (2006.01) |

(52) U.S. Cl.

CPC ............. *E06C 1/36* (2013.01); *A01M 31/025* (2013.01); *E06C 7/081* (2013.01); *E06C 7/182* (2013.01); *E06C 7/48* (2013.01)

(58) Field of Classification Search

CPC ................................ E06C 1/36; A01M 31/025
USPC .......................................................... 182/194
See application file for complete search history.

(56) References Cited

U.S. PATENT DOCUMENTS 2,889,839 A 6/1959 Sheridan
5,371,966 A * 12/1994 Hall ...................... A01M 31/00 135/117
5,704,448 A * 1/1998 Jenkins, Jr. ............. E06C 1/125 182/116
6,105,728 A 8/2000 Combs, Jr.
6,578,666 B1 * 6/2003 Miller ....................... E06C 1/36 182/127
7,168,522 B1 1/2007 Price
7,793,468 B2 9/2010 Dysle
8,777,254 B1 7/2014 Fowler
8,813,913 B2 * 8/2014 Barzilai .................... E06C 1/34 182/206
9,320,955 B2 * 4/2016 Aral Diaz ................. E06C 1/32
2007/0033853 A1 * 2/2007 Ridge ................. A01M 31/025 43/1
2007/0045046 A1 3/2007 Hayes
2013/0140111 A1 * 6/2013 Desai ...................... E06C 7/003 182/129
2020/0370372 A1 * 11/2020 Hoffmann ................. E06C 1/38

* cited by examiner

*Primary Examiner* — Daniel J Troy

(74) *Attorney, Agent, or Firm* — Brennan, Manna & Diamond LLC

(57) ABSTRACT

The present invention relates to a novel duck blind ladder device. The device is a specialized steel frame ladder to help hunters navigate in and out of a duck blind. The duck blind ladder device comprises a body component, comprised of two end-rail components with a plurality of step rails connecting the two end-rail components into a steel welded ladder that is approximately 30" high and 17" wide. Further, the duck blind ladder device comprises a removable handle for holding on to. Additionally, the duck blind ladder device comprises two right-angle hooks at the top of the ladder to secure to the lip of the duck blind. Finally, the ladder also compromises a 6" bottom step to accommodate a user's boots when using the device.

12 Claims, 3 Drawing Sheets

DUCK BLIND LADDER DEVICE

CROSS-REFERENCE TO RELATED APPLICATION

The present application claims priority to, and the benefit of, U.S. Provisional Application No. 63/435,563, which was filed on Dec. 28, 2022, and is incorporated herein by reference in its entirety.

FIELD OF THE INVENTION

The present invention relates generally to the field of duck blind ladder devices. More specifically, the present invention relates to a three-step steel ladder for use with a duck blind. Accordingly, the present disclosure makes specific reference thereto. Nonetheless, it is to be appreciated that aspects of the present invention are also equally applicable to other like applications, devices, and methods of manufacture.

BACKGROUND

By way of background, this invention relates to improvements in duck blind ladder devices. Generally, duck hunters typically jump down onto their swivel chair or other chair device to lower themselves into a duck blind. Then, to retrieve a bird, they have to stand on their swivel chair and pull themselves up and out of the blind. Typically, both of these are dangerous maneuvers, and any slips and falls can cause serious injury.

Accordingly, a need remains for a duck blind ladder device that enables hunters to navigate in and out of a duck blind. Further, a duck blind ladder is necessary to secure to a lip of a duck blind during use.

Therefore, there exists a long-felt need in the art for a duck blind ladder device that provides users with a three-step steel ladder for use with a duck blind. There is also a long-felt need in the art for a duck blind ladder device that features two right angle hooks for convenient attachment to the lip of a duck blind. Further, there is a long-felt need in the art for a duck blind ladder device that includes a 24" removable handle for ease of lowering a hunter into a duck blind. Moreover, there is a long-felt need in the art for a device that eliminates dangerous maneuvers of standing on less than sturdy furniture or equipment to climb in and out of a duck blind. Further, there is a long-felt need in the art for a duck blind ladder device wherein the handle can be removed for concealment while using the duck blind. Finally, there is a long-felt need in the art for a duck blind ladder device that comprises a 6" bottom step to accommodate boots.

The subject matter disclosed and claimed herein, in one embodiment thereof, comprises a duck blind ladder device. The device is a specialized steel frame ladder to help hunters navigate in and out of a duck blind. The duck blind ladder device comprises a body component comprised of two end-rail components with a plurality of step rails connecting the two end-rail components into a steel welded ladder that is approximately 30" high and 17" wide. Further, the duck blind ladder device comprises a removable handle for holding on to. Additionally, the duck blind ladder device comprises two right-angle hooks at the top of the ladder to secure to the lip of the duck blind. Finally, the ladder also compromises a 6" bottom step to accommodate a user's boots when using the device.

In this manner, the duck blind ladder device of the present invention accomplishes all of the foregoing objectives and provides users with a device that provides a welded ladder for entering and exiting a duck blind. The device includes a removable handle. The device can be manufactured of steel or other suitable materials.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a duck blind ladder device. The device is a specialized steel frame ladder to help hunters navigate in and out of a duck blind. The duck blind ladder device comprises a body component comprised of two parallel end-rail components with a plurality of step or rung rails connecting the two end-rail components into a ladder configuration for use in a duck blind.

In one embodiment, the duck blind ladder device comprises a body component comprising two parallel end-rail components with a plurality of step or rung rails connecting the two end-rail components into a ladder configuration. Any suitable number of steps or rungs can be utilized as is known in the art, depending on the needs and/or wants of a user. Typically, the ladder device comprises three steps, to comfortably allow a user to climb up and down with case.

In one embodiment, the duck blind ladder device is approximately 30" in height and 17" wide but can be any suitable shape and size as is known in the art, as long as a user can utilize the ladder device to enter and exit a duck blind or other similar structure. Preferably, the duck blind ladder device should be the same height as the duck blind structure, and typically flush with the top of the duck blind to maintain concealment of the structure. Further, the width of the steps or rungs are typically wide enough, such that a user can stand with both boots or other shoes on a step/rung at the same time.

In one embodiment, there is a plurality of rung rails that are secured between the two parallel end-rail components creating the ladder configuration. The rung rails are typically rods of metal, such as steel, iron, aluminum, an aluminum alloy composite material, metallic alloys, wood, ceramic composites, heavy-duty plastic, or any combination of these materials, etc. The rung rails are secured to the end-rail components via any suitable securing means, such as welding, bolts, screws, etc.

In another embodiment, there is a plurality of step rails that are disposed between the two parallel end-rail components and secured. The step rails are typically rectangular components manufactured of wood, metal, or heavy-duty plastic. Each of the plurality of step rails comprise a front step portion, a rear step portion, a first side portion with a step connector, and an opposing second side portion with an opposing second step connector. The step connector secures the step rails to the end-rail components via gluing, bolts, screws, welding, etc.

In one embodiment, either the rung rails or the step rails comprise a non-slip tread component. The non-slip tread component can be any suitable non-slip material that prevents a user from slipping on the rungs and/or steps during use.

In one embodiment, the steps and/or rungs have a substantially horizontal orientation and the ends of the steps and/or rungs engage the parallel end-rail components to create the ladder configuration. The ends of the steps and/or rungs provide weight bearing support for the steps/rungs and maintain the steps/rungs in a substantially horizontal orientation in the ladder configuration.

In another embodiment, the duck blind ladder device also comprises a 6" bottom step to accommodate a user's boots when using the ladder device. The bottom step can be any suitable shape and size as is known in the art, as long as the bottom step allows the ladder device to stand upright, away from a wall of the duck blind. The bottom step prevents the ladder device from being placed directly against a wall, such that a user does not have room to place their boots/shoes on the rungs/steps of the ladder device, during use. Typically, a 6" bottom step extends outwardly from the pair of rail components and provides for a stable base, such that the ladder device can stand on its own without being placed directly against a wall of the duck blind.

In one embodiment, the duck blind ladder device also comprises a removable handle. The handle can be any suitable shape and size as is known in the art, depending on the needs and/or wants of a user. Typically, the handle secures to one or both of the end-rail components. The handle is typically a rod or bar that fits onto one or both of the end-rail components. Once in place, a user holds onto the handle to easily climb up and down on the ladder device. Once inside the duck blind, the handle can then be removed and placed inside the duck blind to maintain concealment. The handle can then be reattached and used to climb out of the duck blind, via the ladder device.

In another embodiment, the duck blind ladder device comprises two right angle hooks at the top of the ladder device to secure to the lip of the duck blind. The right-angle hooks can be any suitable shape and size as is known in the art, depending on the needs and/or wants of a user, as well as the shape and size of the duck blind. Typically, the top of the duck blind comprises a lip, an edge, or other suitable configuration for securing the ladder device. Generally, the two hooks are shaped in a right-angle configuration, or other similar configuration that allows the ladder device to be hung from the lip or edge of the duck blind. The two hooks are secured to the top of the end-rail components, at an end of the ladder device via any suitable securing means such as gluing, welding, screws, bolts, etc. Once secure, the hooks are then positioned over the lip or edge of the duck blind holding the ladder device in place within the duck blind.

In one embodiment, the duck blind ladder can comprise a plurality of battery-powered lights which are positioned along the end-rail components and/or the step or rung rails to illuminate the device and prevent falls or accidents while climbing up and down the ladder device.

In one embodiment, the duck blind structure comprises a frame, comprising a closed perimeter base with a front member, a rear member, and side members, covered by a cover or other structure with an open top for inserting the duck blind ladder device. Any suitable materials and equipment can be stored within the duck blind structure, depending on the wants and/or needs of a user.

In yet another embodiment, the duck blind ladder device comprises a plurality of indicia.

In yet another embodiment, a method of entering and exiting a duck blind via a ladder device is disclosed. The method includes the steps of providing a duck blind ladder device comprising a body component with two parallel end rails with a plurality of step rails connecting the two end rails into a steel welded ladder. The method also comprises utilizing the two right-angle hooks at the top of the ladder to secure the device to the lip of the duck blind. Further, the method comprises securing the removable handle to the duck blind ladder device, such that a user can use the handle to easily climb up and down the ladder device. Finally, the method comprises utilizing the 6" bottom step, which accommodates a user's boots to climb up the ladder device.

Numerous benefits and advantages of this invention will become apparent to those skilled in the art to which it pertains, upon reading and understanding the following detailed specification.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION OF THE PRESENT INVENTION

Figure 1:
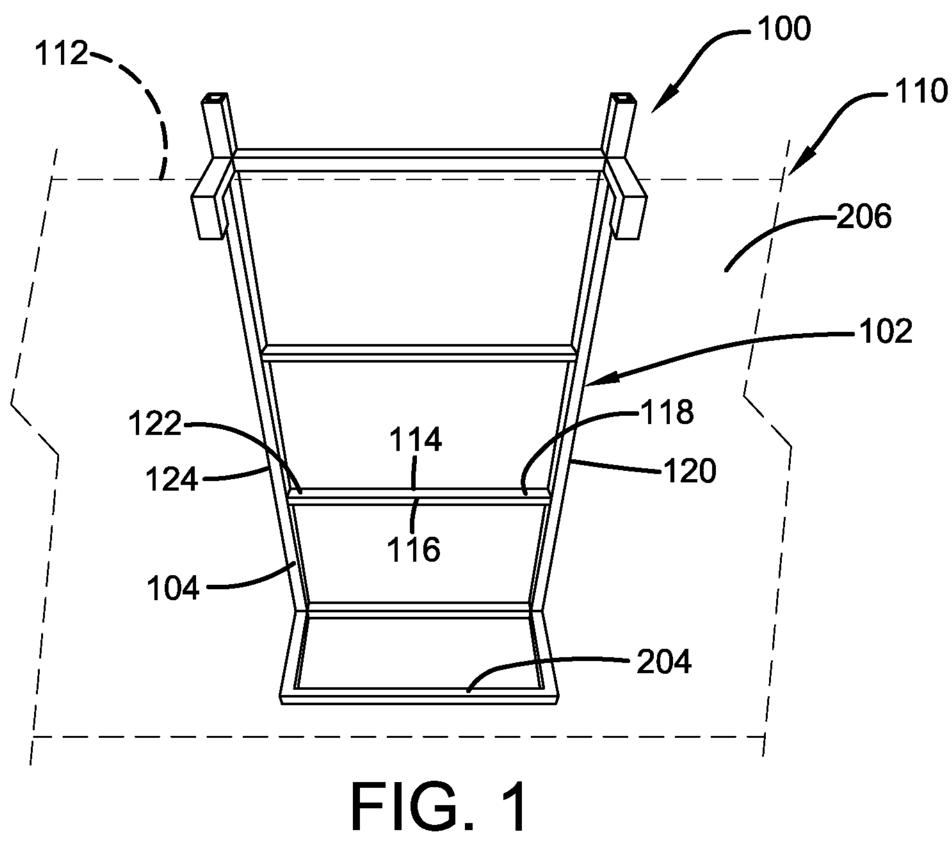
FIG. 1 illustrates a front perspective view of one embodiment of the duck blind ladder device of the present invention in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there is a long-felt need in the art for a duck blind ladder device that provides users with a three-step steel ladder for use with a duck blind. There is also a long-felt need in the art for a duck blind ladder device that features two right-angle hooks for convenient attachment to the lip of a duck blind. Further, there is a long-felt need in the art for a duck blind ladder device that includes a 24" removable handle for ease of lowering a hunter into a duck blind. Moreover, there is a long-felt need in the art for a device that eliminates dangerous maneuvers of standing on less than sturdy furniture or equipment to climb in and out of a duck blind. Further, there is a long-felt need in the art for a duck blind ladder device wherein the handle can be removed for concealment while using the duck blind. Finally, there is a long-felt need in the art for a duck blind ladder device that comprises a 6" bottom step to accommodate boots.

The present invention, in one exemplary embodiment, is a novel duck blind ladder device. The device is a specialized steel frame ladder to help hunters navigate in and out of a duck blind. The duck blind ladder device comprises a body component comprised of two end-rail components with a plurality of step rails connecting the two end-rail components into a steel welded ladder. Further, the duck blind ladder device comprises a removable handle for holding on to. Additionally, the duck blind ladder device comprises two right-angle hooks at the top of the ladder to secure to the lip of the duck blind. Finally, the ladder also compromises a 6" bottom step to accommodate a user's boots when using the device.

The present invention also includes a novel method of entering and exiting a duck blind via a ladder device. The method includes the steps of providing a duck blind ladder device comprising a body component with two parallel end rails with a plurality of step rails connecting the two end rails into a steel welded ladder. The method also comprises utilizing the two right-angle hooks at the top of the ladder to secure the device to the lip of the duck blind. Further, the method comprises securing the removable handle to the duck blind ladder device, such that a user can use the handle to easily climb up and down the ladder device. Finally, the method comprises utilizing the 6" bottom step which accommodates a user's boots to climb up the ladder device.

Referring initially to the drawings, FIG. 1 illustrates a perspective view of one embodiment of the duck blind ladder device 100 of the present invention. In the present embodiment, the duck blind ladder device 100 is an improved duck blind ladder device 100 that helps hunters navigate in and out of a duck blind 110. Specifically, the duck blind ladder device 100 comprises a body component 102 comprised of two parallel end-rail components 104 with a plurality of or rung 108 rails connecting the two end-rail components 104 into a ladder configuration for use in a duck blind 110.

Generally, the duck blind ladder device 100 comprises a body component 102 comprising two parallel end-rail components 104 with a plurality of rung 108 rails connecting the two end-rail components 104 into a ladder configuration. Any suitable number of rungs 108 can be utilized as is known in the art, depending on the needs and/or wants of a user. Typically, the ladder device 100 comprises three rungs 108 to comfortably allow a user to climb up and down with ease.

Furthermore, the duck blind ladder device 100 is approximately 30" in height and 17" wide but can be any suitable shape and size as is known in the art, as long as a user can utilize the ladder device 100 to enter and exit a duck blind 110 or other similar structure. Preferably, the duck blind ladder device 100 should be the same height as the duck blind structure 110 and typically flush with the top 112 of the duck blind 110 to maintain concealment of the structure. Further, the width of the rungs 108 are typically wide enough, such that a user can stand with both boots or other shoes on a rung 108 at the same time.

In one embodiment, there is a plurality of rungs 108 rails that are disposed between the two parallel end-rail components 104 and secured. The rungs 108 are typically rectangular components manufactured of wood, metal, or heavy-duty plastic. Each of the plurality of rungs 108 rails comprise a front step portion 114, a rear step portion 116, a first side portion 118 with a step connector 120, and an opposing second side portion 122 with an opposing second step connector 124. The step connectors 120 and 124 secure the rungs 108 rails to the end-rail components 104 via gluing, bolts, screws, welding, etc., or any other suitable means as is known in the art.

Figure 2:
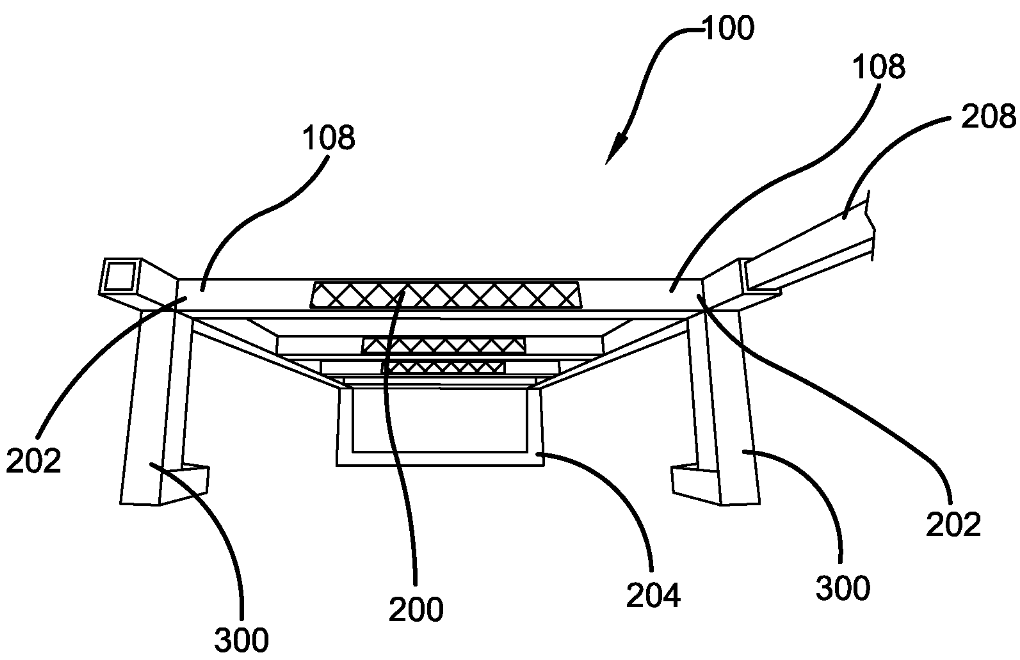
FIG. 2 illustrates a top perspective view of one embodiment of the duck blind ladder device of the present invention showing the 6" bottom step to accommodate boots in accordance with the disclosed architecture.

As shown in FIG. 2, in another embodiment, there is a plurality of rung rails 108 that are secured between the two parallel end-rail components 104 creating the ladder configuration. The rung rails 108 are typically rods of metal, such as steel, iron, aluminum, an aluminum alloy composite material, metallic alloys, wood, ceramic composites, heavy-duty plastic, or any combination of these materials, etc. The rung rails 108 are secured to the end-rail components 104 via any suitable securing means, such as welding, bolts, screws, etc.

Furthermore, in one embodiment, either the rung rails 108 comprise a non-slip tread component 200. The non-slip tread component 200 can be any suitable non-slip material that prevents a user from slipping on the rungs 108 during use.

Generally, the rungs 108 have a substantially horizontal orientation and the ends 202 of the steps 106 and/or rungs 108 engage the parallel end-rail components 104 to create the ladder configuration. The ends 202 of the rungs 108 provide weight bearing support for the rungs 108 and maintain the rungs 108 in a substantially horizontal orientation in the ladder configuration.

Additionally, the duck blind ladder device 100 also compromises a 6" bottom step 204 to accommodate a user's boots when using the ladder device 100. The bottom step 204 can be any suitable shape and size as is known in the art, as long as the bottom step 204 allows the ladder device 100 to stand upright, away from a wall 206 of the duck blind 110. The bottom step 204 prevents the ladder device 100 from being placed directly against a wall 206, such that a user does not have room to place their boots/shoes on the rungs 108 of the ladder device 100 during use. Typically, a 6" bottom step 204 extends outwardly from the pair of rail components 104 and provides for a stable base, such that the ladder device 100 can stand on its own without being placed directly against a wall 206 of the duck blind 110.

Furthermore, the duck blind ladder device 100 also comprises a removable handle 208. The handle 208 can be any suitable shape and size as is known in the art, depending on the needs and/or wants of a user. Typically, the handle 208 secures to one or both of the end-rail components 104. The handle 208 is typically a rod or bar that fits onto one or both of the end-rail components 104. Once in place, a user holds onto the handle 208 to easily climb up and down on the ladder device 100. Once inside the duck blind 110, the handle 208 can then be removed and placed inside the duck blind 110, to maintain concealment. The handle 208 can then be reattached and used to climb out of the duck blind 110 via the ladder device 100.

Figure 3:
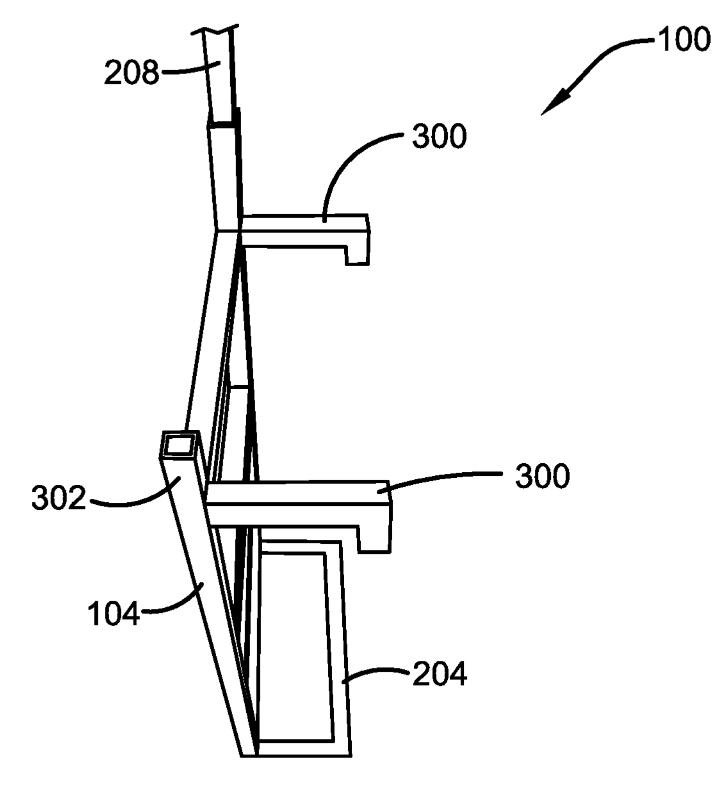
FIG. 3 illustrates a top perspective view of one embodiment of the duck blind ladder device of the present invention showing the two right-angle hooks at the top of the ladder in accordance with the disclosed architecture.

As shown in FIG. 3, the duck blind ladder device 100 comprises two right-angle hooks 300 at the top 302 of the ladder device 100 to secure to the lip 112 of the duck blind 110. The right-angle hooks 300 can be any suitable shape and size as is known in the art, depending on the needs and/or wants of a user, as well as the shape and size of the duck blind 110. Typically, the top 112 of the duck blind 110 comprises a lip, an edge, or other suitable configuration for securing the ladder device 100. Generally, the two hooks 300 are shaped in a right-angle configuration, or other similar configuration that allows the ladder device 100 to be hung from the lip 112 or edge of the duck blind 110. The two hooks 300 are secured to the top 302 of the end-rail components 104 at an end of the ladder device 100 via any suitable securing means such as gluing, welding, screws, bolts, etc. Once secure, the hooks 300 are then positioned over the lip 112 or edge of the duck blind 110, holding the ladder device 100 in place within the duck blind 110.

Figure 4:
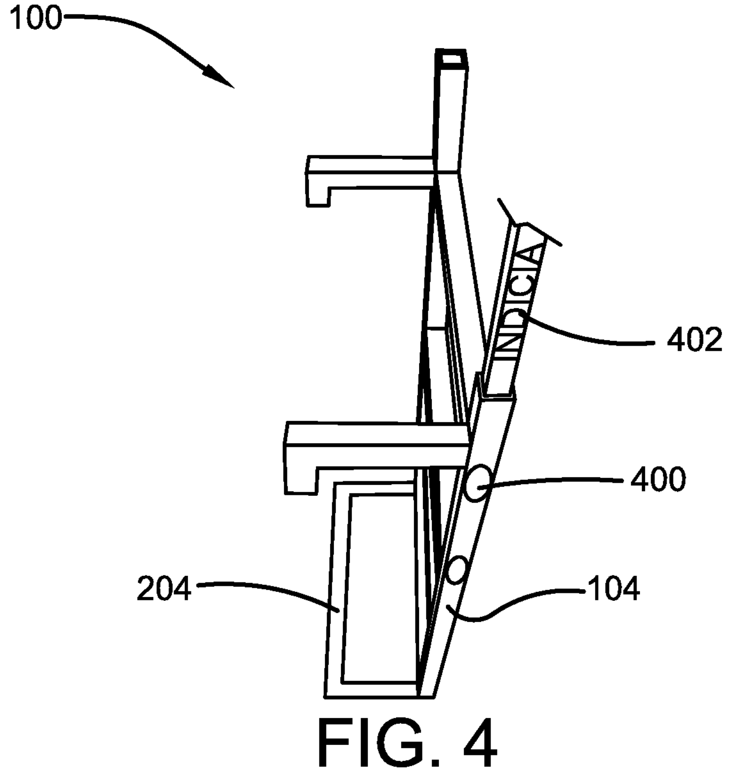
FIG. 4 illustrates a top perspective view of one embodiment of the duck blind ladder device of the present invention showing the removable handle in accordance with the disclosed architecture.

As shown in FIG. 4, the duck blind ladder device 100 can comprise a plurality of battery-powered lights 400 which are positioned along the end-rail components 104 and/or the rung 108 rails to illuminate the device 100 and prevent falls or accidents while climbing up and down the ladder device 100.

Furthermore, the duck blind structure 110 can be any suitable structure as is known in the art, depending on the needs and/or wants of a user. Typically, the duck blind 110 comprises a frame comprising a closed perimeter base with a front member, a rear member, and side members covered by a cover or other structure with an open top for inserting the duck blind ladder device 100. Any suitable materials and equipment can be stored within the duck blind structure 110, depending on the wants and/or needs of a user.

In yet another embodiment, the duck blind ladder device 100 comprises a plurality of indicia 402. The body component 102 of the device 100 may include advertising, trademark, or other letters, designs, or characters, printed, painted, stamped, or integrated into the body component 102, or any other indicia 402 as is known in the art. Specifically, any suitable indicia 402 as is known in the art can be included, such as, but not limited to, patterns, logos, emblems, images, symbols, designs, letters, words, characters, animals, advertisements, brands, etc., that may or may not be hunting, duck, or brand related.

Figure 5:
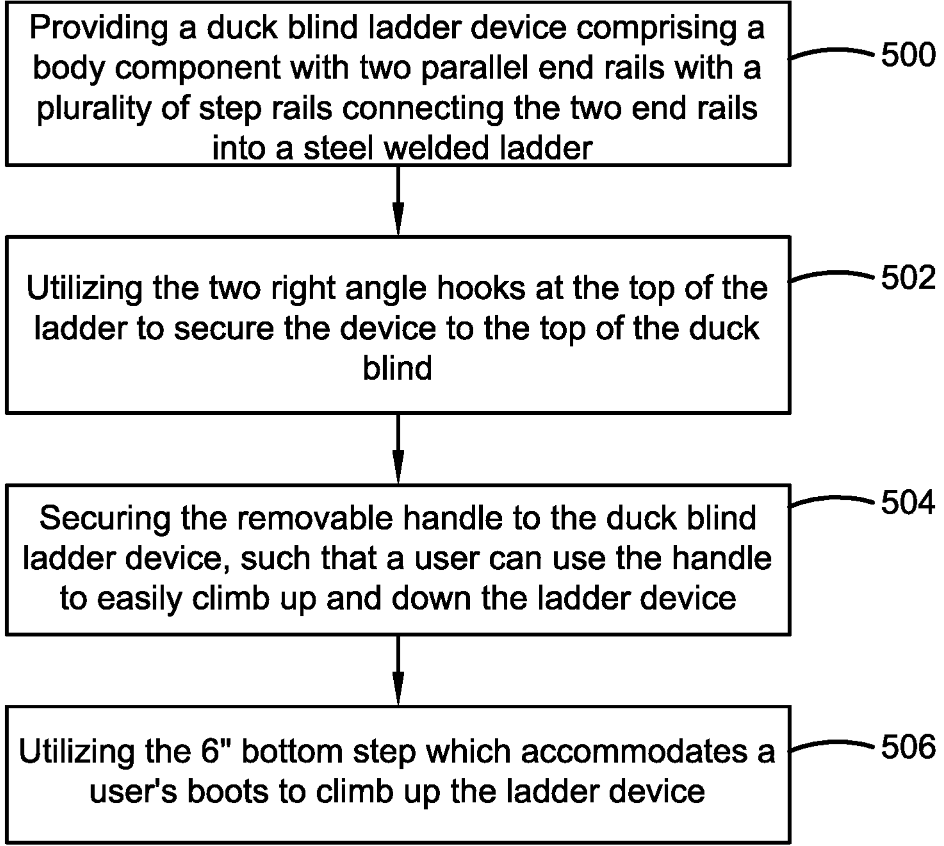
FIG. 5 illustrates a flowchart showing the method of entering and exiting a duck blind via a ladder device in accordance with the disclosed architecture.

FIG. 5 illustrates a flowchart of the method of entering and exiting a duck blind via a ladder device. The method includes the steps of at 500, providing a duck blind ladder device comprising a body component with two parallel end rails with a plurality of step rails connecting the two end rails into a steel welded ladder. The method also comprises at 502, utilizing the two right-angle hooks at the top of the ladder to secure the device to the lip of the duck blind. Further, the method comprises at 504, securing the removable handle to the duck blind ladder device, such that a user can use the handle to easily climb up and down the ladder device. Finally, the method comprises at 506, utilizing the 6" bottom step which accommodates a user's boots to climb up the ladder device.

Certain terms are used throughout the following description and claims to refer to particular features or components. As one skilled in the art will appreciate, different users may refer to the same feature or component by different names. This document does not intend to distinguish between components or features that differ in name but not structure or function. As used herein "duck blind ladder device", "ladder device", and "device" are interchangeable and refer to the duck blind ladder device 100 of the present invention.

Notwithstanding the foregoing, the duck blind ladder device 100 of the present invention can be of any suitable size and configuration as is known in the art without affecting the overall concept of the invention, provided that it accomplishes the above-stated objectives. One of ordinary skill in the art will appreciate that the duck blind ladder device 100 as shown in FIGS. 1-5 are for illustrative purposes only, and that many other sizes and shapes of the duck blind ladder device 100 are well within the scope of the present disclosure. Although the dimensions of the duck blind ladder device 100 are important design parameters for user convenience, the duck blind ladder device 100 may be of any size that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A duck blind ladder device that is configured to help hunters navigate in and out of a duck blind, the duck blind ladder device comprising:

a body component comprising two parallel end-rail components and a plurality of rung rails that include a bottom-most rung rail;

wherein the plurality of rung rails are disposed between the two parallel end-rail components and secured to create a ladder configuration;

wherein the plurality of rung rails have a substantially horizontal orientation and ends of the plurality of rung rails engage the two parallel end-rail components to create the ladder configuration;

wherein the plurality of rung rails provide weight bearing support for a user to climb up and down the duck blind ladder device and into and out of a duck blind; wherein the plurality of rung rails each comprise a non-slip material tread component; and wherein the duck blind ladder device further comprises a bottom step comprising:

two parallel extension portions extending outward from and normal to a front surface of the respective parallel end-rail component, and a connection portion extending parallel to the bottom-most rung rail and between respective ends of the two parallel extension portions located opposite of the parallel end-rail components;

wherein a bottom surface of the bottom-most rung rail, bottom surfaces of the two parallel extension portions, and a bottom surface of the connection portion are coplanar and configured to simultaneously contact a ground surface and allow the duck blind ladder device to stand upright without additional support and to prevent the two parallel end-rail components from having a flush direct contact against a wall of the duck blind thereby providing room for a user's footwear on the plurality of rung rails; and further wherein the two parallel end-rail components are formed of a composite material.

2. The duck blind ladder device of claim 1, wherein the plurality of rung rails are comprised of three rung rails.

3. The duck blind ladder device of claim 2, wherein the duck blind ladder device is approximately 30" in height and 17" wide.

4. The duck blind ladder device of claim 1 further comprising a removable handle.

5. The duck blind ladder device of claim 4, wherein the removable handle is securable to either one of the two parallel end-rail components.

6. The duck blind ladder device of claim 5 further comprising two right-angle hooks secured to a top of the duck blind ladder device.

7. The duck blind ladder device of claim 6, wherein the two right-angle hooks configured to fit over a lip of a duck blind, to secure the duck blind ladder device within the duck blind.

8. The duck blind ladder device of claim 7, wherein the duck blind ladder device comprises a plurality of battery-powered lights positioned along the two parallel end-rail components or the plurality of rung rails.

9. The duck blind ladder device of claim 1 further comprising a plurality of indicia.

10. A duck blind ladder device that is configured to help hunters navigate in and out of a duck blind, the duck blind ladder device comprising:

a body component comprising two parallel end-rail components, a plurality of rung rails, a bottom step, a removable handle, and two right-angle hooks;

wherein the plurality of rung rails that include a bottom-most rung rail are disposed between the two parallel end-rail components in a substantially horizontal orientation and secured to create a ladder configuration;

wherein the plurality of rung rails provide weight bearing support for a user to climb up and down the duck blind ladder device and into and out of a duck blind;

wherein the bottom step comprising:

two parallel extension portions extends outward and normal to a front surface of the respective parallel end-rail component, and a connection portion extending parallel to the bottom-most rung rail and between respective ends of the two parallel extension portions located opposite of the parallel end-rail components;

wherein a bottom surface of the bottom-most rung rail, bottom surfaces of the two parallel extension portions, and a bottom surface of the connection portion are coplanar and configured to simultaneously contact a ground surface and allow the duck blind ladder device to stand upright without additional support and to prevent the two parallel end-rail components from having a flush direct contact against a wall of the duck blind thereby providing room for a user's footwear on the plurality of rung rails;

wherein the removable handle is securable to either one of the two parallel end-rail components during use;

wherein the two right angle hooks are configured to fit over a lip of the duck blind, to secure the duck blind ladder device within the duck blind; and further wherein the duck blind ladder device further comprises a plurality of stamped indicia.

11. The duck blind ladder device of claim 10, wherein the plurality of rung rails comprise a non-slip tread component to prevent injuries.

12. The duck blind ladder device of claim 10, wherein the duck blind ladder device comprises a plurality of battery-powered lights positioned along the two parallel end-rail components or the plurality of rung rails.

* * * * *